United States Patent

Nishizawa et al.

(10) Patent No.: US 6,986,946 B2
(45) Date of Patent: Jan. 17, 2006

(54) TRANSPARENT SYNTHETIC RESIN LAMINATE HAVING PHOTOCHROMISM

(75) Inventors: Chiharu Nishizawa, Tsukuba (JP); Kenji Kouno, Tsukuba (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 62 days.

(21) Appl. No.: 09/980,010

(22) PCT Filed: Apr. 6, 2001

(86) PCT No.: PCT/JP01/02978

§ 371 (c)(1),
(2), (4) Date: Nov. 30, 2001

(87) PCT Pub. No.: WO01/77723

PCT Pub. Date: Oct. 18, 2001

(65) Prior Publication Data

US 2002/0197484 A1    Dec. 26, 2002

(30) Foreign Application Priority Data

Apr. 10, 2000    (JP)    .................... PCT/JP00/02298

(51) Int. Cl.
*B32B 27/40*    (2006.01)

(52) U.S. Cl. .................... 428/412; 428/424.4; 428/500

(58) Field of Classification Search ................ 428/412, 428/423.1, 424.2, 423.7, 426, 424.4, 500; 252/582, 586; 524/89, 90, 94, 95, 104, 110, 524/589, 890; 264/345, 347

See application file for complete search history.

(56) References Cited

U.S. PATENT DOCUMENTS

| 2,370,565 | A | | 2/1945 | Muskat et al. |
| 2,379,218 | A | | 6/1945 | Dial et al. |
| 2,542,386 | A | | 2/1951 | Beattie |
| 4,066,269 | A | * | 1/1978 | Linne .................... 277/575 |
| 4,889,413 | A | * | 12/1989 | Ormsby et al. ........... 351/162 |
| 5,319,007 | A | * | 6/1994 | Bright .................... 523/516 |
| 5,459,176 | A | * | 10/1995 | Bae et al. ................ 522/181 |
| 5,470,930 | A | * | 11/1995 | Toba et al. .............. 526/204 |
| 5,882,556 | A | * | 3/1999 | Perrott et al. ............ 264/1.38 |
| 5,942,158 | A | * | 8/1999 | Okoroafor et al. ......... 252/586 |
| 6,166,129 | A | * | 12/2000 | Rosthauser et al. ........ 524/104 |

FOREIGN PATENT DOCUMENTS

| EP | 0 927 730 A1 | | 7/1999 |
| JP | 63-178193 | | 7/1988 |
| JP | 04-226750 | * | 8/1992 |

OTHER PUBLICATIONS

XP002232717, Derwent Publications Ltd., London, GB; AN 1988-245817 Abstract of JP 63 178193 A (Nippon Sheet Glass Co Ltd), Jul. 22, 1988.

Refractive index control of transparent polymer "Chemical Survey" No. 39, 1998, p. 174-175 edited by the Japanese Chemical Society.

Company Brochure, Mitsubishi Gas Chemical Company, Inc. Osaka Plant.

* cited by examiner

*Primary Examiner*—James J. Seidleck
*Assistant Examiner*—Melanie Bissett
(74) *Attorney, Agent, or Firm*—Sughrue Mion Zinn Macpeak & Seas

(57) ABSTRACT

A transparent synthetic resin laminate with photochromism property consisting essentially of two transparent synthetic resin layers and a photochromic layer formed by curing a mixture of a two liquid polyurethane of a polyurethane prepolymer and a curing agent and a photochromic organic compound which is interposed between said two transparent synthetic resin layers.

18 Claims, No Drawings

TRANSPARENT SYNTHETIC RESIN LAMINATE HAVING PHOTOCHROMISM

FIELD OF ART

The present invention relates to a transparent synthetic resin laminate with photochromism property and, specifically, to a transparent synthetic resin laminate with excellent photochromism property exhibiting both a high color development speed and a high color disappearance speed. The transparent synthetic laminate may be used as an optical lens and is excellent in both control of thickness of a photochromic coated film and surface smoothness thereof.

BACKGROUND OF THE INVENTION

As conventional optical lenses such as photochromic lenses, inorganic lenses have generally been used. That is, usually, an organic coating layer with photochromic property was added to a surface of a glass or a surface of plastic lenses such as CR-39. Recently, as a lens itself, the use of plastic lenses with high impact resistance have spread. Particularly, in United States of America, lenses made from a polycarbonate have widely proliferated and demand for a sun glass with impact resistance has rapidly increased because of extensive outdoor activities.

As synthetic resin laminates with photochromism property, hitherto, a laminate obtained by adding a photochromic organic compound to a silicone surface curing coating agent and then coating it on one side of a substrate and then performing cure and a laminate obtained by adding a photochromic organic compound to an urethane coating agent and then coating it on one side of a synthetic resin laminate and then performing cure have been known (Japanese Patent Kokai (Laid-open) No. 63-178193).

However, in the process for coating a coating agent containing a photochromic organic compound on one side of a synthetic resin substrate, it was difficult to obtain a smooth coated film surface and to control a thickness of a coated film. Thus, when a coated film surface is not smooth, it is not practically preferable since use of the laminate as a photochromic lens causes distortion through the lens.

Further, Japanese Patent Kokai (Laid-open) No. 61-148048 discloses a photochromic laminate with a photochromic layer containing a spironaphtho oxazine derivative interposed between transparent material layers. Although the prior art discloses an example in which one liquid type polyurethane resin is contained in a photochromic layer, both a color development speed and a color disappearance speed are low, and thus that photochromic laminate is insufficient.

Moreover, also in photochromic lenses, various processes such as direct kneading into a resin and coating on a resin surface have been tried. However, they are not successful and are not put into practice because of performance problems due to insufficient heat resistance of the photochromic elements during kneading and, also due to problems in surface coating, and contrast shortage from limitation of coated film thickness.

Thus, in the present situation, there exists no transparent synthetic resin laminate with photochromism property as a photochromic lens in which both a color development speed and a color disappearance speed are high and surface smoothness of a coated film and control of coated film thickness in a photochromic layer are excellent.

DISCLOSURE OF THE INVENTION

The present invention solves the above-mentioned problems in the prior art. An object of the present invention is to provide a transparent synthetic resin laminate with photochromism property in which both a color development speed layer are excellent. and a color disappearance speed are high and contrast in color development is maintained for a long time and surface smoothness of a coated film and the control of thickness of a coated film in a photochromic layer are excellent.

As a result of studies of the above-mentioned problems in the prior art, the inventors have invented a transparent synthetic resin laminate in which both a color development speed and a color disappearance speed are high and contrast in color development is maintained for a long time and the surface smoothness of a coated film and the control of thickness of a coated film in a photochromic layer are excellent, by interposing a photochromic layer formed by curing a mixture of a two-liquid type polyurethane of a polyurethane prepolymer and a curing agent, a photochromic organic compound, a light stabilizer and an antioxidant between two transparent synthetic resin layers, to accomplish the present invention.

That is, the present invention provides a transparent synthetic resin laminate with photochromism property consisting essentially of two transparent synthetic resin layers and a photochromic layer formed by curing a mixture of a two liquid polyurethane of a polyurethane prepolymer and a curing agent and a photochromic organic compound and further a light stabilizer and an antioxidant which is interposed between said two transparent synthetic resin layers.

Further, the present invention provides a process for producing a transparent synthetic resin laminate with photochromism property which comprises:

coating a mixture of a two-liquid polyurethane of a polyurethane prepolymer and a curing agent, a photochromic organic compound and a solvent and further a light stabilizer and an antioxidant on one side of a transparent synthetic resin sheet, then, removing the solvent from the mixture to a state not to contain substantially the solvent, then, adhering another transparent synthetic resin sheet to the coated side of said synthetic resin sheet, and then, curing the two-liquid polyurethane, thereby, forming a photochromic layer.

The present invention will be described in detail below.

The transparent synthetic resin to be used in the present invention is not limited as long as it is a resin with high transparency. It is preferable to use a polycarbonate resin and a polymethylmethacrylate resin. As the combination of two transparent synthetic resins, a polycarbonate resin, a polymethylmethacrylate or both thereof is (are) applied to each two transparent synthetic resins. A transparent synthetic resin with a thickness of 50 to 2000 μm is applied. Particularly, when bending processing into a lens form is performed, it is preferable to use a synthetic resin sheet with a thickness of 100 to 1000 μm.

In the present invention, there is provided a photochromic layer formed by cure of a two-liquid polyurethane of a polyurethane prepolymer and a curing agent containing a photochromic organic compound, a light stabilizer and an antioxidant which is interposed between two transparent synthetic resin layers. Thereby, it becomes possible to produce industrially a transparent synthetic resin laminate excellent in both heat resistance and impact resistance which exhibits a high color development speed and a high color disappearance speed in use as a lens and possesses photochromic performance excellent in surface smoothness of a coated film in a photochromic layer equivalent to conventional inorganic type and maintains a photochromic characteristics such as contrast in color development for a long time.

Generally, polyurethane includes one-liquid type and two-liquid type. In the present invention, it is preferable to use a two-liquid polyurethane of a polyurethane prepolymer and a curing agent from the aspects of color development speed and color disappearance speed and solubility of photochromic compound and various additives. Actually, a prepolymer is dissolved in a specific solvent and mixed with various additives including a photochromic compound and then a curing agent is added thereto.

As the polyurethane prepolymer, a compound obtained by reaction of isocyanate and polyol in a specific proportion is used. That is, the polyurethane prepolymer is a compound with an isocyanate group on both ends obtained from diisocyanate and polyol. As the diisocyanate compound to be used for the polyurethane prepolymer, diphenylmethane-4,4'-diisocyanate (MDI) is preferable. Further, as the polyol, it is preferable to use polypropylene glycol (PPG) with a polymerization degree of 5 to 30.

The molecular of the polyurethane prepolymer is a number average molecular weight of 500 to 5000 and preferably 1500 to 4000 and more preferably 2000 to 3000.

On the other hand, the curing agent is not limited as long as it is a compound with two hydroxyl groups. Examples of the curing agent include polyurethane polyol, polyether polyol, polyester polyol, acryl polyol, polybutadiene polyol and polycarbonate polyol, among which polyurethane polyol with a hydroxyl group on its end obtained from specific isocyanate and specific polyol is preferable. Particularly, polyurethane polyol with a hydroxy group on at least both ends derived from diisocyante and polyol is preferable and it is preferable to use tolylenediisocyanate (TDI) as the diisocyanate. Further, as the polyol, it is preferable to use PPG with a polymerization degree of 5 to 30.

The molecular weight of the curing agent is a number average molecular weight of 500 to 5000 and preferably 1500 to 4000 and more preferably 2000 to 3000.

In order to adjust the viscosity of the polyurethane prepolymer and the curing agent, a solvent such as ethyl acetate and tetrahydrofurane may be used.

In the present invention, the organic compound with photochromic property is not limited as long as it has good compatibility with the polyurethane prepolymer. Photochromic organic compound obtainable on the market can be used. As the photochromic organic compound, spiropyran compounds, spiroxazine compounds and naphthopyran compounds are preferably used from the aspect of photochromic performance.

Examples of the spiropyran compound include 1',3',3'-trimethylspiro(2H-1-benzopyran-2,2'-indoline), 1',3',3'-trimethylspiro-8-nitro(2H-1-benzopyran-2,2'-indoline), 1',3',3'-trimethyl-6-hydroxyspiro(2H-1-benzopyran-2,2'-indoline), 1',3',3'-trimethylspiro-8-methoxy(2H-1-benzopyran-2,2'-indoline), 5'-chloro-1',3',3'-trimethyl-6-nitrospiro(2H-1-benzopyran-2,2'-indoline), 6,8-dibromo-1',3',3'-trimethylspiro(2H-1-benzopyran-2,2'-indoline), 8-ethoxy-1',3',3',4',7'-pentamethylspiro( 2H-1-benzopyran-2,2'-indoline), 5'-chloro-1',3',3'-trimethylspiro-6,8-dinitro(2H-1-benzopyran-2,2'-indoline), 3,3,1-diphenyl-3H-naphtho( 2,1-b)pyran, 1,3,3-triphenylspiro[indoline-2,3'-(3H)-naphtho(2,1-b)pyran], 1-(2,3,4,5,6-pentamethylbenzyl)-3,3-dimethylspiro[indoline-2,3'-(3H)-naphtho( 2,1-b)pyran], 1-(2-methoxy-5-nitrobenzyl)-3,3-dimethylspiro[ indoline-2,3'-naphtho(2,1-b)pyran], 1-(2-nitrobenzyl)-3,3-dimethylspiro[indoline-2,3'-naphtho (2,1-b)pyran], 1-(2-naphthylmethyl)-3,3-dimethylspiro [indoline-2,3'-naphtho (2,1-b)pyran] and 1,3,3-trimethyl-6'-nitro-spiro[2H-1-benzopyran-2,2'-[2H]-indole].

Examples of the spiroxazine compound include 1,3,3-trimethylspiro[indolino-2,3'-[3H]naphtho [2,1-b] [1,4]oxazine], 5-methoxy-1,3,3-trimethylspiro [indolino-2,3'-[3H] naphtho[2,1-b][1,4]oxazine], 5-chloro-1,3,3-trimethylspiro [indolino-2,3'-[3H]naphtho [2,1-b][1,4]oxazine], 4,7-diethoxy-1,3,3-trimethylspiro[ indolino-2,3'-[3H]naphtho[2, 1-b][1,4] oxazine], 5-chloro-1-butyl-3,3-dimethylspiro [indolino-2,3'-[3H]naphtho[2,1-b][1,4]oxazine], 1,3,3,5-tetramethyl-9'-ethoxyspiro[indolino-2,3'-[3H]naphtho[ 2,1-b][1,4]oxazine], 1-benzyl-3,3-dimethylspiro[ indoline-2,3'-[3H]naphtho[2,1-b][1,4]oxazine], 1-( 4-methoxybenzyl)-3,3-dimethylspiro[indoline-2,3'-[3H] naphtho[2,1-b][1,4] oxazine], 1-(2-methylbenzyl)-3,3-dimethylspiro[ indoline-2,3'-[3H]naphtho[2,1-b][1,4] oxazine], 1-(3,5-dimethylbenzyl)-3,3-dimethylspiro[ indoline-2,3'-[3H] naphtho[2,1-b][1,4]oxazine], 1-( 4-chlorobenzyl)-3,3-dimethylspiro[indoline-2,3'-[3H] naphtho[2,1-b][1,4] oxazine], 1-(4-bromobenzyl)-3,3-dimethylspiro[ indoline-2,3'-[3H]naphtho[2,1-b][1,4] oxazine], 1-(2-fluorobenzyl)-3,3-dimethylspiro[ indoline-2,3'-[3H]naphtho[2,1-b][1,4] oxazine], 1,3,5,6-tetramethyl-3-ethylspiro[indoline-2,3'-[3H] pyrido[3,2-f][1,4]-benzoxazine], 1,3,3,5,6-pentamethylspiro[ indoline-2,3'-[3H]pyrido[3,2-f] [1,4]-benzoxazine], 6'-(2,3-dihydro-1H-indole-1-yl)-1,3-dihydro-3,3-dimethyl-1-propyl-spiro[2H-indole-2,3'-[3H] naphtho [2,1-b][1,4]oxazine], 6'-(2,3-dihydro-1H-indole-1-yl)-1,3-dihydro-3,3-dimethyl-1-(2-methylpropyl)-spiro[ 2H-indole-2,3'-[3H]-naphtho[2,1-b][1,4] oxazine], 1,3,3-trimethyl-1-6'-(2,3-dihydro-1H-indole-1-yl)-spiro[ 2H-indole-2,3'-[3H]-naphtho[2,1-b][1,4] oxazine], 1,3,3-trimethyl-6'-(1-piperidinyl)-spiro[2H-indole-2,3'-[3H]-naphtho[2,1-b][1,4] oxazine], 1,3,3-trimethyl-6'-(1-piperidinyl)-spiro[2H-indole-2,3'-[3H]-naphtho[ 2,1-b][1,4]oxazine], 1,3,3-trimethyl-6'-(1-piperidinyl)-6-(trifluoromethyl)-spiro[2H-indole-2,3'-[ 3H]-naphtho[2,1-b][1,4]oxazine]and 1,3,3,5,6-pentamethyl-spiro[ 2H-indole-2,3'-[3H]-naphtho[2,1-b] [1,4]oxazine].

Examples of the naphthopyran compound include 3,3-diphenyl-3H-naphtho[2,1-b]pyran, 2,2-diphenyl-2H-naphtho[ 1,2-b]pyran, 3-(2-fluorophenyl)-3-(4-methoxyphenyl)-3H-naphtho[2,1-b]pyran, 3-(2-methyl-4-methoxyphenyl)-3-(4-ethoxyphenyl)-3H-naphtho[2,1-b] pyran, 3-(2-furil)-3-(2-fluorophenyl)-3H-naphtho[2,1-b] pyran, 3-(2-thienyl)-3-(2-fluoro-4-methoxyphenyl)-3H-naphtho[ 2,1-b]pyran, 3-{2-(1-methylpyrrolidinyl)}-3-( 2-methyl-4-methoxyphenyl)-3H-naphtho[2,1-b]pyran, spiro (bicyclo[3.3.1]nonane-9,3'-3H-naphtho[2,1-b] pyran), spiro (bicyclo[3.3.1]nonane-9-2'-3H-naphtho[ 2,1-b]pyran), 4-[4-[6-(4-morpholinyl)-3-phenyl-3H-naphtho[ 2,1-b]pyran-3-yl]phenyl]-morpholine, 4-[3-(4-methoxyphenyl)-3-phenyl-3H-naphtho[2,1-b]pyran-6-yl]-morpholine, 4-[3,3-bis(4-methoxyphenyl)-3H-naphtho[2,1-b] pyran-6-yl]-morpholine, 4-[3-phenyl-3-[4-(1-piperidinyl)phenyl]-3H-naphtho[2,1-b]pyran-6-yl]-morpholine and 2,2-diphenyl-2H-naphtho[2,1-b]pyran.

In order to ensure the life of the synthetic resin laminate of the present invention, it is necessary to add various stabilizers. As the stabilizer, light stabilizers such as hindered amine and antioxidants such as hindered phenol are added.

Examples of hindered amine include bis(2,2,6,6-tetramethyl-4-piperidinyl)sebacate, bis(1,2,2,6,6-pentamethyl-4-piperidinyl)sebacate, bis(1,2,2,6,6-pentamethyl-4-piperidinyl)-[[3,5-bis(1,1-dimethylethyl)]-[ 4-hydroxyphenyl] methyl]butyl malonate, 1-(methyl)-8-(1,2,2,6,6-pentamethyl-4-piperidinyl)-sebacate, 1-[2-(3-(3,5-di-t-butyl-4-hydroxyphenyl)propionyloxy)ethyl]-4-[3-(3,5-di-t-butyl-4-hydroxyphenyl)propionyloxy]-2,2,6,6-tetramethylpiperidine, 4-benzoyloxy-2,2,6,6-tetramethylpiperidine, triethylene-diamine and 8-acetyl-3-dodecyl-7,7,9,9-tetramethyl-1,3,8-triazaspiro[4,5]decane-2,4-dione. As other nickel ultraviolet ray stabilizer, [2,2'-thiobis(4-t-octylphenolate)]-n-butylamine nickel, nickel complex-3,5-di-t-butyl-4-hydroxybenzyl.phsophoric acid monoethylate and nickel.dibutyl carbamate also can be used. Particularly, as hindered amine light stabilizer, bis(1,2,2,6, 6-pentamethyl-4-piperidinyl)-sebacate or a condensation product of 1,2,2,6,6-pentamethyl-4-piperidinol, tridodecyl alcohol and 1,2,3,4-butanetetra caboxylic acid as tertiary hindered amine compound is preferable.

Examples of the antioxidant include 1,1,3-tris( 2-methyl-4-hydroxy-5-t-butylphenyl) butane, 2,2'-methylenebis(4-ethyl-6-t-butylphenol), tetrakis-[ methylene-3-(3',5'-di-t-butyl-4'-hydroxyphenyl)propionate] methane, 2,6-di-t-butyl-p-cresol, 4,4'-butylidenebis( 3-methyl-6-t-butylphenol), 1,3,5-tris(3'-5'-di-t-butyl-4'-hydroxybenzyl)-S-triazine-2, 4,6-(1H, 3H,5H)trione, stearyl-β-(3,5-di-t-butyl-4-hydorxyphenyl) propionate, 1,3,5-tris(4-t-butyl-3-hydroxy-2,6-dimethyl-benzyl)isocyanuric acid, 4,4'-thiobis( 3-methyl-6-t-butylphenol) and 1,3,5-trimethyl-2,4,6-tris(3,5-di-t-butyl-4-hydroxybenzyl)benzene.

Particularly, as phenol antioxidant, 1,1,3-tris( 2-methyl-4-hydorxy-5-t-butylphenyl)butane, tetrakis-[methylene-3-(3',5'-di-t-butyl-4'-hydroxyphenyl)propionate] methane and 1,3,5-tris(3,5-di-t-butyl- 4-hyroxybenzyl)-1,3,5-triazine-2,4, 6-(1H,3H,5H)-trione which contain 3 or above of hindered phenol are preferable.

The transparent synthetic resin laminate with photochromic property of the present invention is produced according to below process. A photochromic organic compound is added in the proportion of 0.2 to 5% to resin solid matter to a solution of a polyurethane prepolymer diluted with specific organic solvent and an additive(s) of hindered amine light stabilizer and/or antioxidant is (are) further added thereto in the proportion of 0.1 to 5% to resin solid matter and uniformly mixed with stirring. Then, a curing agent is further added thereto in a I/H ratio of isocyanate group (I) to hydroxyl group (H) of the curing agent of 0.9 to 20 and preferably 1 to 10 as a standard and stirring is further performed to form a solution. It is suitable that the polymer concentration in the solution thus obtained is usually 40 to 90% by weight. The solution is coated with a doctor blade of coating thickness 100 to 1000 μm on one side of a transparent synthetic resin sheet. After the completion of coating, heat drying is performed to the state substantially not containing the solvent on the coated surface and another transparent synthetic resin sheet is adhered to the coated surface of said synthetic resin sheet in a sandwich form. The above-mentioned heat drying is usually performed at 20 to 50° C. for 5 to 60 minutes. A laminate sheet thus obtained is heated to cure the polyurethane prepolymer containing the curing agent, whereby a transparent synthetic resin laminate is obtained. The curing conditions of the polyurethane prepolymer are usually 60 to 140° C. and 2 hours to 1 week.

Examples of the solvent include hydrocarbons such as hexane, heptane, octane, cyclohexane, toluene, xylene and ethyl benzene, esters such as ethyl acetate, methyl acetate, isopropyl acetate, n-propyl acetate, isobutyl acetate, n-butyl acetate, isoamyl acetate, methyl propionate and isobutyl propionate, ketones such as acetone, methylethyl ketone, diethyl ketone, methylisobutyl ketone, acetyl acetone and cyclohexyl ketone, ether esters such as cellosolve aetate, diethylglycol diaetate, ethyleneglycol mono n-butylether acetate, propylene glycol and monomethylether acetate, tertiary alcohols such as diacetone alcohol and t-amyl alcohol and tetrahydrofuran. Particularly, ethyl aetate, tetrahydrofuran and toluene are preferable.

BEST MODE FOR CARRYING OUT THE INVENTION

The present invention will be described in more detail below, referring to Examples, which are not intended to limit the scope of the present invention.

EXAMPLES 1 TO 4

2% of Photochromic compound 1 or 2 to resin solid matter and 1 to 2% of Additive 1 to resin solid matter were dissolved in a solution of 15 g of a polyurethane precursor having a NCO group equivalent weight (equivalent weight: average molecular weight per one functional group) of 1500 obtained by reaction of diphenylmethane-4,4'-diisocyanate and polypropylene glycol having an average polymerization degree of 15 diluted with 8.3 g of tetrahydrofuran and stirred until uniformity was ensured and then 3 g of a curing agent having a hydroxyl group equivalent weight of 1050 obtained by reaction of tolylene diisocyanate and polypropylene glycol having an average polymerization degree of 10 was added thereto and further stirred.

The solution thus obtained was coated with a doctor blade of coating thickness 400 μm, manufactured by Yoshimitsu Seiki K. K., in Japan on a polycarbonate film of thickness 700 μm (trade name: IUPILON, manufactured by Mitsubishi Gas Chemical Co., Inc.). After the completion of coating, the solvent was vaporized at 45° C. for 10 minutes in a hot air dryer and the polycarbonate film was adhered to make a sheet form and then beat curing was performed at 70° C. for 2 days. The measurement of the transmittance in maximum absorption wave length and the evaluation of the light resistance for the synthetic resin laminate thus obtained were performed and the thickness of the photochromic layer was measured and its appearance was observed. The proportion of each component for the formation of the laminates was shown in Table 1. The evaluation results of the laminated were shown in Table 2.

Photochromic compound 1:
1,3-dihydro-1,3,3,5,6(1,3,3,4,5)pentamethyl-spiro[ 2H-indole-2,3-[3H]-naphtho[2,b][1,4]oxazine]

Photochromic compound 2:
3,3-diphenyl-3H-naphtho[2,1-b]pyran

Additive 1:
bis(2,2,6,6-tetramethyl-4-piperidinyl)sebacate

Each performance was evaluated according to the following methods.

[Measurement of Transmittance]
A single wave length light of 360 nm was irradiated with an ultramonochromatic light source and transmittance after 5 minutes from the starting of the irradiation and transmittance in non-irradiation were measured. A spectrophotometer, manufactured by Nihon Bunko k. k., in Japan was used in the measurement of transmittance and the transmittance in maximum absorption wave length was measured.

[Evaluation of Light Resistance]

Contrast prior to exposure and contrast after exposure for 60 hours to a sunshine weather meter under below conditions were measured. In order to compare with contrast prior to exposure, contrast retention percentage was calculated to evaluate its life.

(1) Setting Conditions of Sunshine Weather Meter
Irradiance: 255 w/m² (300 to 700 nm)
Temperature: room temperature
Rainfall was not applied.

(2) Calculation of Contrast Retention Percentage (%)

Contrast retention percentage (%)= $(L*_3-L*_4) \times 100/(L*_1-L*_2)$ $L*_1$: contrast prior to light resistance test (in ultraviolet light non-irradiation)
$L*_2$: contrast prior to light resistance test (in ultraviolet light irradiation)
$L*_3$: contrast after light resistance test (in ultraviolet light non-irradiation)
$L*_4$: contrast after light resistance test (in ultraviolet light irradiation)

(3) Evaluation

Contrast life was evaluated based on the following criterion.

○: contrast retention percentage after light resistance test is 70% or above.

Δ: contrast retention percentage after light resistance test is below 70%.

[Color Development Speed and Color Disappearance Speed]

Color development speed (ta) and color disappearance speed (tb) were measured as below.
T1: transmittance in non-irradiation of ultraviolet light
T2: transmittance in irradiation of ultraviolet light
ta: a time in which transmittance is changed from T1 to (T1+T2)/2 by irradiation of ultraviolet light
tb: a time in which transmittance is changed from T2 to (T1+T2)/2 by shielding irradiated ultraviolet light Both ta and tb were determined by a curve of change of transmittance in maximum absorption wave length with the lapse of time.

COMPARATIVE EXAMPLE 1

The synthetic resin laminate was obtained in the same experiment as in Example 1 except that the urethane was changed to solvent type one-liquid, Hamatai Y-7122-A, manufactured by Yokohama Gomu k. k., in Japan. The proportion of each component was shown in Table 1 and the evaluation results were shown in Table 2.

EXAMPLES 5 TO 12

1% of Photochromic compound 3 to resin solid matter, 0.5% of Photochromic compound 4 to resin solid matter were added to a solution of 15 g of a polyurethane precursor diluted with 13.6 g of an organic solvent (toluene 4.6 g, methylethyl ketone 1.8 g and ethyl acetate 7.2 g) in the same manner as in Example 1 and each Additives 1 to 4 was further added thereto in the blend proportion shown in Table 3 and dissolved and 1.6 g of the same curing agent as in Example 1 was added thereto and stirred.

The solution thus obtained was coated with a doctor blade of coating thickness 300 μm, manufactured by Yoshimitsu Seiki k. k., in Japan on a polycarbonate film of thickness 300 μm (trade name: IUPILON, manufactured by Mitsubishi Gas Chemical Co., Inc.). After the completion of coating, the solvent was vaporized at 45° C. for 10 minutes in a hot air dryer. Another polycarbonate film of 300 μm was adhered thereto to make a sheet form and heat curing was performed at 70° C. for 3 days. The same evaluation as in Example 1 was performed for the synthetic resin laminate thus obtained. In the evaluation of light resistance, the evaluation was performed by changing the apparatus and further increasing ultraviolet light radiant intensity. The evaluation results were shown in Table 4. Further, when the samples thus prepared were exposed to sun light, they presented brown and when they were put in a dark place, color disappearance occurred.

Organic Photochromic Compound 3:
4-[4-[6-(4-morpholynyl)-3-phenyl-3H-naphtho[ 2,1-b]pyran-3-yl]phenyl]-morpholine Organic Photochromic Compound 4:
1,3-dihydro-1,3,3,5,6(1,3,3,4,5)-pentamethyl-spiro( 2H-indole-2,3-[3H]-naphtho[2,b][1,4]oxazine]

Additive 1: the Same as in Example 1
bis(2,2,6,6-tetramethyl-4-piperidinyl)sebacate Additive 2:
bis(1,2,2,6,6-pentamethyl-4-piperidinyl)sebacate Additive 3:
bis(1,2,2,6,6-pentamethyl-4-piperidinyl)sebacate
1-(methyl)-8-(1,2,2,6,6-pentamethyl-4-piperidinyl)-sebacate Additive 4:
1,1,3-tris(2-methyl-4-hydroxy-5-t-butylphenyl)butane The [measurement of transmittance] and measurement and evaluation of [color development speed and color disappearance speed] was performed in the same manner as in Example 1.

[Evaluation of Light Resistance]

As the evaluation, a UV lamp was irradiated for 5 minutes prior to light resistance test and after light resistance test and then contrast due to color development and color difference were measured and contrast retention percentage and color change degree in color disappearance in the light resistance test were calculated. Thus, light resistance was evaluated. In the light resistance test, an apparatus with a xenon lamp as the light source (apparatus name: SUNTEST CPS+, maker: manufactured by ATLAS) was used and an irradiance of 750 W/m² (300 to 800 nm) for 20 hours was applied. Further, the UV lamp had a single wave length of 360 nm in an ultramonochromatic light source (Nihon Bunko k. k., in Japan).

① Calculation of Contrast Retention Percentage
It was calculated in the same method as in Example 1.

② Calculation of Color Change Degree color change degree= $[(L*_1-L*_3)^2+(a*_1-a*_3)^2+(b*_1-b*_3)^2]^{1/2}$ $a*_1$: a* value prior to light resistance test (ultraviolet light non-irradiation)
$a*_3$: a* value after light resistance test (ultraviolet light non-irradiation)
$b*_1$: b* value prior to light resistance test (ultraviolet light non-irradiation)

b*₃: b* value after light resistance test (ultraviolet light non-irradiation)

③ Evaluation

○: After light resistance test, contrast is 70% or above and color change degree is below 5%.

Δ: After light resistance test, contrast is below 70% and color change degree is 5% or above.

INDUSTRIAL APPLICABILITY

In the formation of a polyurethane layer on a transparent synthetic resin surface, a polyurethane layer could be formed without impairing any photochromic performance by using specific two-liquid thermosetting poyurethane and mixing a polyurethane prepolymer, a curing agent and various additives including a photochromic compound in specific solvent and a transparent synthetic resin laminate with photochromism property to provide high availability could be produced efficiently by ensuring substantially non-solvent state thereof and then adhering another transparent synthetic resin and then performing heat cure. Further, a plastic lens with high photochromic performance and smooth photochromic layer could be obtained readily by using the laminate.

TABLE 1

|  | Polyurethane precursor (g) | Curing agent (g) | THF (Note 1) (g) | Species of photochromic compound | Concentration of photochromic compound (g) | Additive | Concentration of additive (%) |
|---|---|---|---|---|---|---|---|
| Example 1 | 15 | 3 | 8.3 | 1 | 2 | 1 | 1 |
| 2 | 15 | 3 | 8.3 | 1 | 2 | 1 | 2 |
| 3 | 15 | 3 | 8.3 | 2 | 2 | 1 | 1 |
| 4 | 15 | 3 | 8.3 | 2 | 2 | 1 | 2 |
| Comp. Ex. 1 | 30 (Note 2) | — | — | 1 | 2 | 1 | 1 |

(Note 1) tetrahyrofuran
(Note 2) solvent type one-liquid

TABLE 2

|  | Thickness of Photochromic layer (μm) | Color in color development | Maximum absorption wave length (nm) | Transmittance in maximum absorption wave length ultraviolet light | | Color development speed ta (sec) | Color disappearance speed tb (sec) | Appearance | Life |
|---|---|---|---|---|---|---|---|---|---|
|  |  |  |  | in non-irradiation (%) | in irradiation (%) |  |  |  |  |
| Example 1 | 177 | blue | 620 | 83 | 58 | 13 | 13 | good | ○ |
| 2 | 178 | blue | 620 | 83 | 58 | 13 | 13 | good | ○ |
| 3 | 181 | yellow | 440 | 87 | 65 | 10 | 10 | good | ○ |
| 4 | 179 | yellow | 440 | 88 | 65 | 10 | 10 | good | ○ |
| Comp. Ex. 1 | 175 | blue | 620 | 80 | 52 | 23 | 26 | good | Δ |

TABLE 3

|  | Polyurethane precursor (g) | Curing agent (g) | Toluene MEK (Note 3) ethyl acetae | Photochromic compound | | Additive | | | |
|---|---|---|---|---|---|---|---|---|---|
|  |  |  |  |  |  | light stabilizer | | antioxidant | |
|  |  |  |  | species | concentration (%) | species | concentration (%) | species | concentration (%) |
| Example 5 | 15 | 1.6 | 13.6 | 3 | 1.0 | 2 | 3.0 | — | — |
|  |  |  |  | 4 | 0.5 |  |  |  |  |
| Example 6 | 15 | 1.6 | 13.6 | 3 | 1.0 | 2 | 3.0 | 4 | 3.0 |
|  |  |  |  | 4 | 0.5 |  |  |  |  |
| Example 7 | 15 | 1.6 | 13.6 | 3 | 1.0 | 3 | 3.0 | — | — |
|  |  |  |  | 4 | 0.5 |  |  |  |  |
| Example 8 | 15 | 1.6 | 13.6 | 3 | 1.0 | 3 | 3.0 | 4 | 3.0 |
|  |  |  |  | 4 | 0.5 |  |  |  |  |
| Example 9 | 15 | 1.6 | 13.6 | 3 | 1.0 | 1 | 3.0 | — | — |
|  |  |  |  | 4 | 0.5 |  |  |  |  |
| Example 10 | 15 | 1.6 | 13.6 | 3 | 1.0 | 3 | 15.0 | — | — |
|  |  |  |  | 4 | 0.5 |  |  |  |  |
| Example 11 | 15 | 1.6 | 13.6 | 3 | 1.0 | 3 | 15.0 | 4 | 3.0 |
|  |  |  |  | 4 | 0.5 |  |  |  |  |

TABLE 3-continued

| | Polyurethane precursor (g) | Curing agent (g) | Toluene MEK (Note 3) ethyl acetae | Photochromic compound species | Photochromic compound concentration (%) | Additive light stabilizer species | Additive light stabilizer concentration (%) | Additive antioxidant species | Additive antioxidant concentration (%) |
|---|---|---|---|---|---|---|---|---|---|
| Example 12 | 15 | 1.6 | 13.6 | 3 | 1.0 | — | — | — | — |
| | | | | 4 | 0.5 | | | | |

(Note 3) methylethyl ketone

TABLE 4

| | Thickness of photochromic layer (μm) | Maximum absorption wave length (nm) | Transmittance in maximum absorption wave length ultraviolet light in non-irradiation (%) | Transmittance in maximum absorption wave length ultraviolet light in irradiation (%) | Color development speed ta (sec) | Color disappearance speed tb (sec) | Appearance | Life contrast retention percent (%) | Life color change degree | Evaluation |
|---|---|---|---|---|---|---|---|---|---|---|
| Example 5 | 133 | 460 | 84 | 63 | 13 | 15 | good | 72 | 3 | ○ |
| Example 6 | 140 | 460 | 84 | 65 | 14 | 16 | good | 74 | 2 | ○ |
| Example 7 | 137 | 460 | 85 | 61 | 14 | 16 | good | 70 | 4 | ○ |
| Example 8 | 128 | 460 | 84 | 67 | 14 | 16 | good | 73 | 3 | ○ |
| Example 9 | 136 | 460 | 85 | 65 | 13 | 15 | good | 43 | 7 | Δ |
| Example 10 | 132 | 460 | 85 | 63 | 14 | 16 | good | 51 | 4 | Δ |
| Example 11 | 135 | 460 | 84 | 66 | 14 | 16 | good | 56 | 3 | Δ |
| Example 12 | 138 | 460 | 85 | 67 | 13 | 15 | good | 34 | 10 | Δ |

What is claimed is:

1. A transparent synthetic resin laminate with photochromism property consisting essentially of two transparent synthetic resin sheet layers and a photochromic layer interposed between said two transparent synthetic sheet layers, wherein the transparent synthetic resin in said two transparent synthetic resin sheet layers, is, each the same or different, a polycarbonate resin or a polymethyl methacrylate resin and said photochromic layer is a cured polyurethane reaction product obtained from a first mixture consisting essentially of a polyurethane prepolymer with an isocyanate group on both ends obtained from a second mixture consisting of diisocyanate and polypropylene glycol, a curing agent consisting of a polyurethane polyol with a hydroxyl group on at least both ends obtained from diisocyanate and polyol, a photochromic organic compound and a solvent, adhering to each said two transparent synthetic resin sheet layers.

2. The laminate according to claim 1, wherein said first mixture further contains a light stabilizer and/or an antioxidant.

3. The laminate according to claim 2, wherein said light stabilizer is a tertiary hindered amine light stabilizer.

4. The laminate according to claim 2, wherein said light stabilizer is a tertiary hindered amine light stabilizer and said antioxidant is an antioxidant containing at least three hindered phenol groups.

5. The laminate according to claim 1, wherein said photochromic organic compound is a spiropyran compound, a spirooxiazine compound or a naphthopyran compound.

6. A process for producing a transparent synthetic resin laminate with photochromic property which comprises:

coating a first mixture consisting essentially of a polyurethane prepolymer with an isocyanate group on both ends obtained from a second mixture consisting of diisocyanate and polypropylene glycol, a curing agent consisting of a polyurethane polyol with a hydroxyl group on at least both ends obtained from diisocyanate and polyol, a photochromic organic compound and a solvent on one side of a first transparent synthetic resin sheet of a polycarbonate resin or a polymethyl methacrylate resin, then, removing the solvent from said first mixture to form a third substantially solvent-free mixture, then, adhering a second transparent synthetic resin sheet of a polycarbonate resin or a polymethyl methacrylate resin to the coated side of said first transparent synthetic resin sheet, and then, curing said third substantially solvent-free mixture, thereby, forming a photochromic layer.

7. The laminate according to claim 6, wherein said first mixture further contains a light stabilizer and/or an antioxidant.

8. A process for producing a plastic lens with photochromic property comprising bending a transparent synthetic resin laminate with photochromism property described in claim 1, wherein said polycarbonate resin is a polycarbonate resin made of bisphenol A.

9. A transparent synthetic resin laminate with photochromism property consisting essentially of two transparent synthetic resin sheet layers and a photochromic layer interposed between said two transparent synthetic sheet layers, wherein the transparent synthetic resin in said two transparent synthetic resin sheet layers, is, each the same or different, a polycarbonate resin or a polymethyl methacrylate resin and said photochromic layer is a cured polyurethane reaction product obtained from a first mixture consisting of a polyurethane prepolymer with an isocyanate group on both ends obtained from a second mixture consisting of diisocyanate and propylene glycol, a curing agent consisting of a polyurethane polyol with a hydroxyl group on at least both ends obtained from diisocyanate and polyol, a photochromic organic compound and solvent, adhering to each said two transparent synthetic resin sheet layers.

10. The laminate according to claim 9, wherein said photochromic organic compound is a spiropyran compound, a spirooxiazine compound or a naphthopyran compound.

11. A transparent synthetic resin laminate with photochromism property consisting essentially of two transparent synthetic resin sheet layers and a photochromic layer interposed between said two transparent synthetic sheet layers, wherein the transparent synthetic resin in said two transparent synthetic resin sheet layers, is, each the same or different, a polycarbonate resin or a polymethyl methacrylate resin and said photochromic layer is a cured polyurethane reaction product obtained from a first mixture consisting of a polyurethane prepolymer with an isocyanate group on both ends obtained from a second mixture consisting of diisocyanate and polypropylene glycol, a curing agent consisting of polyurethane polyol with a hydroxyl group on at least both ends obtained from diisocyanate and polyol, a photochromic organic compound, solvent and a light stabilizer and/or an antioxidant, adhering to each said two transparent synthetic resin sheet layers.

12. The laminate according to claim 11, wherein said photochromic organic compound is a spiropyran compound, a spirooxiazine compound or a naphthopyran compound.

13. The laminate according to claim 11, wherein said light stabilizer is a tertiary hindered amine light stabilizer.

14. The laminate according to claim 11, wherein said light stabilizer is a tertiary hindered amine light stabilizer and said antioxidant is an antioxidant containing at least three hindered phenol groups.

15. A process for producing a transparent synthetic resin laminate with photochromism property which comprises:
coating a first mixture consisting of a polyurethane prepolymer with an isocyanate group on both ends obtained from a second mixture consisting of diisocyanate and polypropylene glycol, a curing agent consisting of a polyurethane polyol with a hydroxyl group on at least both ends obtained from diisocyanate and polyol, a photochromic organic compound and a solvent on one side of a first transparent synthetic resin sheet of a polycarbonate resin or a polymethyl methacrylate resin, then, removing the solvent from said first mixture to form a third substantially solvent-free mixture, then, adhering a second transparent synthetic resin sheet of a polycarbonate resin or a polymethyl methacrylate resin to the coated side of said first transparent synthetic resin sheet, and then, curing said third substantially solvent-free mixture, thereby, forming a photochromic layer.

16. A process for producing a transparent synthetic resin laminate with photochromism property which comprises:
coating a first mixture consisting of a polyurethane prepolymer with an isocyanate group on both ends obtained from a second mixture consisting of diisocyanate and polypropylene glycol, a curing agent consisting of a polyurethane polyol with a hydroxyl group on at least both ends obtained from diisocyanate and polyol, a photochromic organic compound, a solvent and a light stabilizer and/or an antioxidant on one side of a first transparent synthetic resin sheet of polycarbonate resin or a polymethyl methacrylate resin, then, removing the solvent from said first mixture to form a third substantially solvent-free mixture, then, adhering a second transparent synthetic resin sheet of a polycarbonate resin or a polymethyl methacrylate resin to the coated side of said first transparent synthetic resin sheet, and then, curing said third substantially solvent-free mixture, thereby, forming a photochromic layer.

17. A process for producing a plastic lens with photochromism property comprising bending a transparent synthetic resin laminate with photochromism property described in claim 9, wherein said polycarbonate resin is a polycarbonate made from bisphenol A.

18. A process for producing a plastic lens with photochromism property comprising bending transparent synthetic resin laminate with photochromism property described in claim 11, wherein said polycarbonate resin is a polycarbonate made from bisphenol A.

* * * * *